United States Patent [19]

Matsuura et al.

[11] Patent Number: 4,933,771
[45] Date of Patent: Jun. 12, 1990

[54] FACSIMILE MACHINE HAVING A PAGE PRINTING FUNCTION

[75] Inventors: Yozo Matsuura, Machida; Yuji Koseki, Sagamihara, both of Japan

[73] Assignee: Ricoh Company, Ltd., Tokyo, Japan

[21] Appl. No.: 267,647

[22] Filed: Nov. 4, 1988

Related U.S. Application Data

[63] Continuation of Ser. No. 932,109, Nov. 18, 1986, abandoned.

[30] Foreign Application Priority Data

Nov. 18, 1985 [JP] Japan .................................. 60-256648
Jan. 14, 1986 [JP] Japan .................................... 61-4144

[51] Int. Cl.$^5$ ............................................. H04N 1/21
[52] U.S. Cl. ..................................... 358/296; 358/451
[58] Field of Search ............... 358/257, 287, 294, 296, 358/300, 304

[56] References Cited

U.S. PATENT DOCUMENTS

| | | | |
|---|---|---|---|
| 4,301,479 | 11/1981 | Fukinuki et al. | 358/260 X |
| 4,439,790 | 3/1984 | Yoshida | 358/257 X |
| 4,506,302 | 3/1985 | Kurata | 358/294 X |
| 4,580,177 | 4/1986 | Arimoto | 358/287 X |
| 4,631,596 | 12/1986 | Yaguchi | 358/257 X |

FOREIGN PATENT DOCUMENTS 87675  6/1982  Japan ................................... 358/304

Primary Examiner—Leo P. Picard
Assistant Examiner—Lincoln Donovan
Attorney, Agent, or Firm—Oblon, Spivak, McClelland, Maier & Neustadt

[57] ABSTRACT

A facsimile machine provided with a page printer for printing image data on one or more cut sheets of recording medium. In the case where at least two differently sized cut sheets of recording medium are selectively used for recording of received image data, the facsimile machine includes a control system to keep the first selected size until recording of all of the image data of the same original document has been completed. In another embodiment, the amount of a single page of data and the size of cut sheet of recording medium in use are constantly monitored, and if the amount of a single page of data is equal to or less than half of the size of cut sheet of recording medium in use, then two pages of data are recorded on a single cut sheet of recording medium.

6 Claims, 8 Drawing Sheets

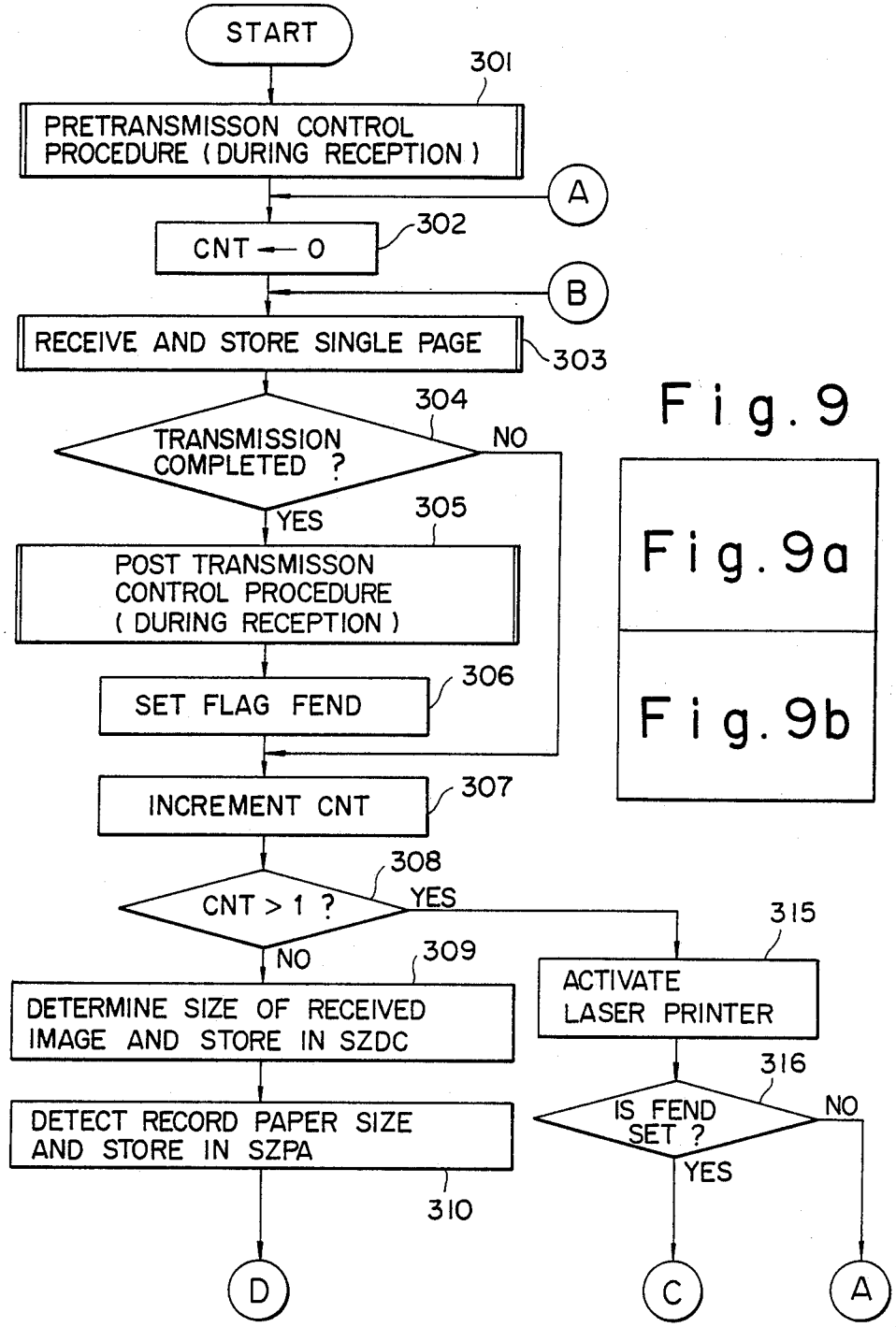

FACSIMILE MACHINE HAVING A PAGE PRINTING FUNCTION

This application is a continuation of application Ser. No. 932,109, filed on Nov. 18, 1986, now abandoned.

BACKGROUND OF THE INVENTION

1. Field of the Invention

This invention generally relates to a fascimile machine, and, in particular, to a facsimile machine having a page printing function.

2. Description of the Prior Art

A facsimile machine generally includes an image sensor for optically reading an original image to be transmitted, a recording unit for recording a received image on a recording medium and a communication unit for transmitting and receiving an image to and from another facsimile machine at a remote location. As the facsimile machine is being disseminated widely, there appears a growing demand for an even faster facsimile machine. In order to make a high-speed facsimile machine, it is necessary to provide not only a high-speed communication unit, but also a high-speed image sensor and recorder.

A vast majority of the facsimile machines currently in use employ a thermal printhead as a recording unit. Typically, the thermal printhead includes a plurality of heat-producing elements, such as electrical resistors, which are arranged in a spaced apart relationship at a predetermined pitch along a straight line extending in a direction transverse to the direction of advancement of a recording medium, which is normally a web of heat-sensitive paper stored in the form of a roll. In such a thermal printer type recording unit, the heat-sensitive paper in the form of a roll is unwound and transported in contact with the thermal printhead, to which an image signal to be recorded is supplied, and, thus, dark "burn" points are selectively formed on the heat-sensitive paper to form a printed image thereon.

In such a thermal printer type recording unit, the heat-sensitive paper is unrolled, an image is printed on the paper and the paper is cut to a desired size. The size is usually determined by the size of an original image received from a transmitter. In such a system, when a plurality of original documents different in size are received, there are produced cut sheets of printed paper different in size correspondingly. However, it is often desired that received images are all printed on the same size of cut sheets of paper even if the original documents have a variety of sizes. For this purpose, it has been proposed to provide a facsimile machine having a page printing function. The most typical example is a facsimile machine including a laser printer as its recording unit. In this case, a laser beam modulated by an image signal is deflected by a rotating polygon mirror and the deflected laser beam is scanned across a photosensitive member, thereby forming an electrostatic latent image thereon. Then, the latent image is developed by application of a developer and the thus developed image is then transferred to a transfer medium. In this case, since an electrophotographic process is used in printing a received image on a recording medium, image information is recorded on a page-by-page basis. In this respect, the laser printer falls onto the category of a page printer.

The page printer is fast in operation and allows to use plain paper as a recording medium, and, thus, the incorporation of a page printer into a facsimile machine as its recording unit presents an opportunity to provide a high-speed facsimile machine. Other than a laser printer, the page printer also includes an electrostatic printer which uses a multi-stylus head, to which an image signal is applied, for directly forming an electrostatic latent image on an imaging member, such as photosensitive or dielectric member. A further example of the page printer is a liquid crystal shutter printer which includes an array of liquid crystal shutters disposed between a light source and a photosensitive member, whereby the liquid crystal shutters are selectively operated in accordance with an image signal to form an electrostatic latent image on the photosensitive member.

A facsimile machine having a page printer is preferably provided with two or more cassettes for providing cut sheets of paper different in size. In such a facsimile machine, when an original image out of a predetermined size is received, it is recorded on two or more sheets of paper as divided. However, for example, when a facsimile machine receiving an original image having the A size width and a length beyond the predetermined size is provided with a pair of paper cassettes for B4 size and A4 size, the larger B4 size paper is first selected so as to minimize the number of recording cycles. In this case, however, if the last remaining portion of the original image is shorter in length than the A4 size, then the A4 size paper will be used to print this portion. This is inconvenient because the same original image is printed on two or more sheets of recording paper different in size, i.e., only the last sheet being different from the other sheets. In addition, if a facsimile machine is provided with a pair of cassettes containing B4 and A4 size cut sheets of recording paper, respectively, and a plurality of original images all in A5 size are being received, each of the A5 size original images is printed on a single cut sheet of B4 or A4 size paper, more than half of which is left unused.

SUMMARY OF THE INVENTION

In accordance with the present invention, there is provided a facsimile machine having a plurality of cut sheets of recording mediums different in size, wherein the facsimile machine stores information regarding the selection of a particular size of recording medium for use in recording information thereon and keeps the selected size throughout recording the information on two or more sheets as divided. In the preferred embodiment, while receiving an image to be recorded, if the number of print lines received has exceeded that of the maximum size of the cut sheets of recording mediums set in the facsimile machine, then recording of the received image is initiated using the maximum sized cut sheet and at the same time the selection of maximum sized cut sheet is retained at least during the recording of the received image. With this structure, the received image is always insured to be recorded on the same sized cut sheets when recorded as divided.

In accordance with another aspect of the present invention, there is provided a facsimile machine having a page printing function and at least one size of cut sheets of recording medium, wherein if a received image is equal to or less than half the size of the cut sheets set in the facsimile machine and there are two or more such received images, printing is effected with two such received images for one cut sheet of recording medium with possible exception for the last sheet if there is left only one such received image for the last sheet of recording paper. With this structure, the waste of recording paper can be minimized.

It is therefore a primary object of the present invention to obviate the disadvantages of the prior art as described above and to provide an improved facsimile machine.

Another object of the present invention is to provide an improved facsimile machine fast in operation and convenient to use.

A still further object of the present invention is to provide an improved facsimile machine capable of providing an excellent printed image which does not deteriorate due to aging.

A still further object of the present invention is to provide an improved facsimile machine which uses cut sheets of recording medium and which allows to minimize the waste of recording medium.

Other objects, advantages and novel features of the present invention will become apparent from the following detailed description of the invention when considered in conjunction with the accompanying drawings.

BRIEF DESCRIPTION OF THE DRAWINGS

FIG. 9 is an illustration showing how FIGS. 9a and 9b should be combined; and FIGS. 9a and 9b, when combined, show a flow chart which is useful for explaining the operation of the facsimile machine shown in FIGS. 7 and 8.

DESCRIPTION OF THE PREFERRED EMBODIMENTS

Figure 1:
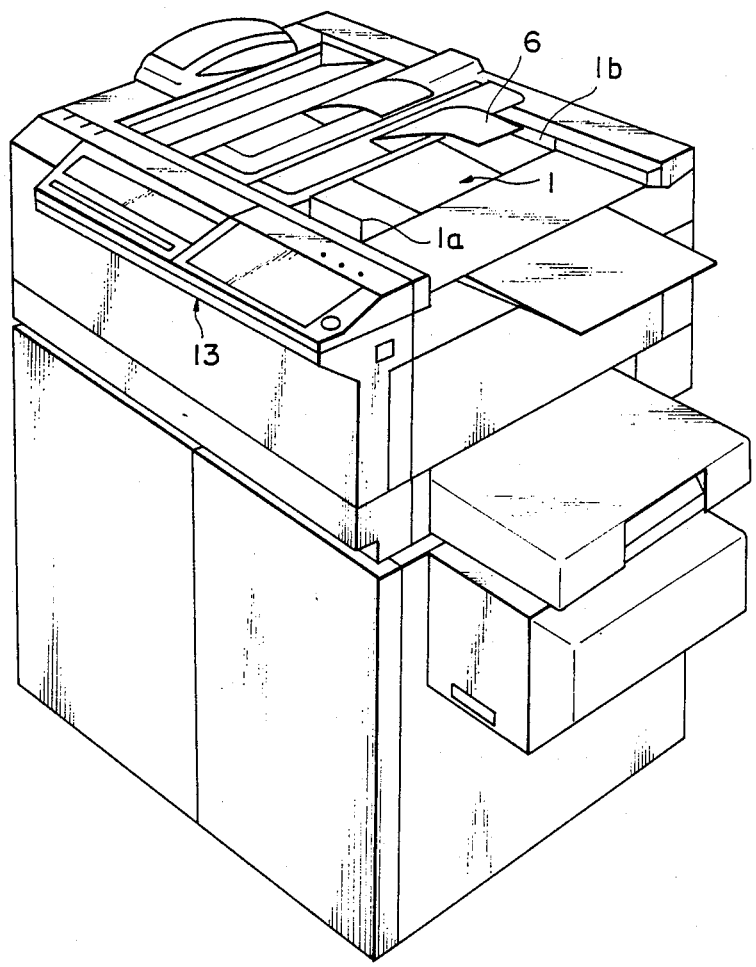
FIG. 1 is a schematic illustration showing a facsimile machine constructed in accordance with one embodiment of the present invention.
Figure 2:
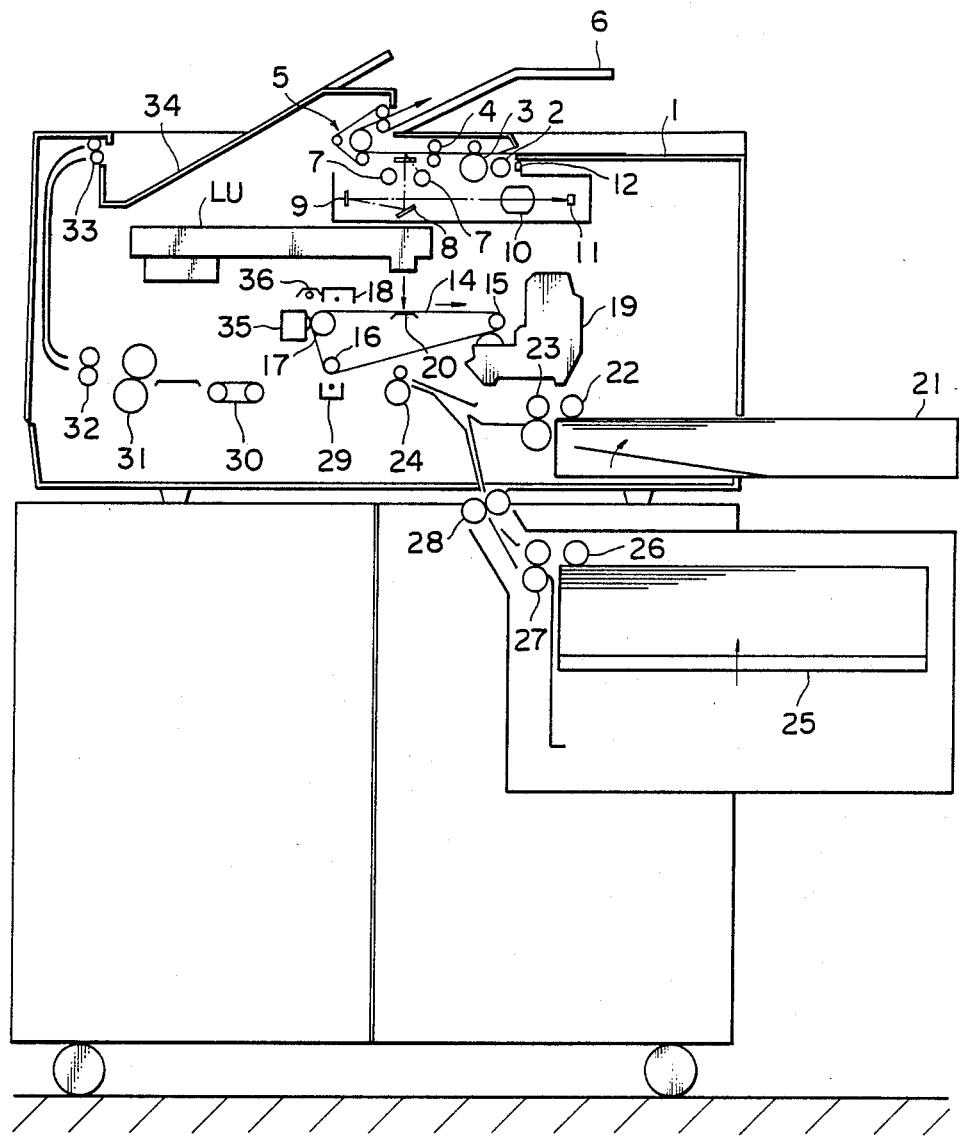
FIG. 2 is a schematic illustration showing in detail the interior of the facsimile machine illustrated in FIG. 1.

Referring now to FIGS. 1 and 2, there is schematically shown a facsimile machine constructed in accordance with one embodiment of the present invention. The illustrated facsimile machine generally includes three sections: an image reading section including a image scanner 11, a recording section including a laser printer, and a control system shown in FIG. 3 for controlling the overall operation of the facsimile machine. A control panel 13 is provided at the front side thereby allowing an operator to provide desired instructions to the present facsimile machine. In the illustrated facsimile machine, since use is made of the laser printer, image can be output at high speed using an electrophotographic process.

As shown in FIGS. 1 and 2, the illustrated facsimile machine includes an original holder 1 for placing thereon a plurality of original documents to be optically read in the form of a stack. The original documents thus stacked on the original holder 1 are fed one by one from the bottommost one by means of a pick-up roller 2 which is disposed at the supply end of the original holder 1. A separating roller 3 is disposed in downstream of the pick-up roller 2 with respect to the direction of advancement of the original document, so that it is insured that only one, or bottommost one, of the stacked original documents is fed into an original document transporting path defined in a housing of the facsimile machine. A transporting roller 4 is disposed downstream of the separating roller 3 for transporting the original document separated from the stack by the separating roller 3 through an optical reading section defined at a portion of the original document transporting path. After moving past the reading section, the original document enters an inverting and discharging section 5 so that the original document is discharged onto a tray 6 as inverted, or face directed upward.

At the reading section defined between the transporting roller 4 and the inverting and discharging section 5, a light source including a pair of lamps 7, 7 is disposed so that the light emitted from the lamps 7, 7 illuminates the surface of the original document and the reflected light from the original document is reflected by a pair of reflecting mirrors 8 and 9 and focused onto a line image sensor 11 through a lens 10. Thus, as the original document moves past the image reading section, the image of the original document is optically read line by line.

It is to be noted that, as best shown in FIG. 1, a pair of side guides 1a and 1b is adjustably provided at the original holder 1. These side guides 1a and 1b are shiftable in position sideways and thus may be set in position depending on the width of an original document to be read. These side guides 1a and 1b help to keep the original documents set in position in the widthwise direction when they are stacked on the original holder 1. As shown in FIG. 2, there is also provided an original document sensor 12 which is operatively associated with the pair of side guides 1a and 1b for detecting the size, or more particularly the width of the original documents stacked on the original holder 1. It should be noted that a signal from the original document sensor 12 indicates not only the width of original documents placed on the original holder 1, but also the fact whether or not any original document is on the original holder 1.

Now, the recording section including a laser printer of the present facsimile machine will be described. As shown in FIG. 2, the facsimile machine includes a laser unit LU from which a laser beam modulated by an image signal to be recorded is output and directed onto an imaging surface of an imaging member 14, such as a photosensitive member, in the form of an endless belt. In the illustrated embodiment, the imaging belt 14 is extended around three rollers 15 through 17, at least one of which may be driven to rotate, for example, by means of a driver motor, so that the imaging belt 14 may be driven to travel in a direction indicated by the arrow at constant speed. Around the imaging belt 14 are disposed a corona charging unit 18, a developing unit 19, a corona image transfer unit 29 and a cleaning unit 35 in the order mentioned in the travelling direction of the imaging belt 14.

In operation, as the imaging belt 14 is driven to travel at constant speed in the direction indicated by the arrow, the outer or imaging surface becomes uniformly charged to a selected polarity by the corona charging unit 18. The laser beam modulated by an image signal to be recorded is then applied to the imaging belt 14 thus charged uniformly, so that the charge is selectively dissipated in accordance with a light pattern defined by the laser beam, thereby forming an electrostatic latent image on the imaging belt 14. As the imaging belt 14 further travels, the latent image is developed by the developing unit 19, which typically uses colored pigment, such as toner, and, thus, there is formed a developed toner image on the imaging belt 14. It is to be noted that, in the illustrated embodiment, a back plate 20 is provided at an exposure station in contact with the back or inside surface of the imaging belt 14 so as to keep the imaging belt 14 flat as much as possible at least locally at the image exposure station.

On the other hand, the present facsimile machine includes a pair of first and second feeding units for feeding a cut sheet of recording medium having a first size and a cut sheet of recording medium having a second size, respectively. In the illustrated embodiment, a cassette 21 is detachably mounted in the facsimile machine and it stores therein a quantity of cut sheets of recording medium, typically plain paper, having a first predetermined size. The cassette 21 is set in position as partly fitted into the facsimile machine with its supply end located at an entrance to a first recording medium transporting path defined in the facsimile machine leading to the image transfer unit 29. A pick-up roller 22 is provided in the facsimile machine so as to be brought into contact with the topmost sheet of the stack of cut sheets of recording medium stored in the cassette 21 when the cassette 21 is set in position. Also provided downstream of the pick-up roller 22 is a separating roller 23 for insuring that only one cut sheet of recording paper is fed into the first recording medium transporting path. Also provided in the present facsimile machine is a registration roller 24 which is located in the first recording medium transporting path and which is intermittently driven to rotate to feed a cut sheet of recording paper in association with the travelling condition of the imaging belt 14. Although not shown specifically in FIG. 2, it should be understood that a size sensor for detecting the presence and absence and/or the size of the cut sheets of recording medium stored in the cassette 21 is provided in the present facsimile machine.

A feeding tray 25 is also provided in the facsimile machine to define a high volume recording medium supply unit and the feeding tray 25 is provided to be movable vertically. A great quantity of cut sheets of recording medium having a second predetermined size may be placed on the feeding tray 25 in the form of a stack. It is to be noted that a second recording medium transporting path is defined in the facsimile machine leading from a supply end of the high volume recording medium supply unit to the image transfer unit 29 through the registration roller 24. Thus, the path between the registration roller 24 and the image transfer unit 29 is shared by the first and second recording medium transporting paths. A pick-up roller 26 is disposed at the supply end of the large volume recording medium supply unit and it is intermittently driven to rotate to feed the topmost sheet of the recording medium stacked on the tray 25. A separating roller 27 is disposed downstream of the pick-up roller 26 for insuring that only one cut sheet of recording medium is fed into the second recording medium transporting path. Also provided in the second recording medium transporting path is an intermediate transporting roller 28. Although not shown specifically in FIG. 2, it should be understood that a size sensor for detecting the presence and absence and/or the size of cut sheets of recording medium stored as stacked on the tray 25 is provided in the present facsimile machine.

With the structure described above, the pick-up rollers 22 and 26 are selectively driven to rotate to supply a cut sheet of recording medium, and, thus, the cut sheet of recording medium thus supplied is transported until its leading edge comes into abutment against the registration roller 24 which normally remains stationary. In association with the travelling motion of the imaging belt 14, the registration roller 24 is driven to rotate so that the cut sheet of recording medium is caused to be brought into contact with the imaging belt 14 and move past the image transfer unit 29, whereby the developed toner image on the imaging belt 14 is transferred to the cut sheet of recording paper. In the preferred embodiment, the timing of driving the registration roller 24 in association with the movement of the imaging belt 14 is such that the leading edge of the cut sheet of recording medium transported by the registration roller 24 comes to be substantially aligned with the leading edge of the developer toner image formed on the imaging belt 14.

After image transfer, the cut sheet of recording medium is separated away from the imaging belt 14 and then transported to an image fixing unit 31 by a transporting belt 30. In this connection, it should be noted that a radius of curvature set by the imaging belt 14 around the roller 16 is so set that the cut sheet of recording medium may be separated away from the imaging belt because of its stiffness, which tends to keep the cut sheet of recording medium moving straight toward the transporting belt 30 while the imaging belt 14 is suddenly directed upward toward the roller 17. While the cut sheet of recording medium moves through the image fixing unit 31, the transferred toner image becomes permanently fixed to the cut sheet of recording medium. Then, the thus completed cut sheet of recording medium is discharged onto a stacker 34 by means of discharging rollers 32 and 33.

On the other hand, any remaining toner on the imaging belt 14 after image transfer is removed by the cleaning unit 35 and then collected into a storage tank (not shown). The thus collected toner may be recycled to the developing unit 19 for reuse, if desired. An erasure lamp 36 is also disposed between the cleaning unit 35 and the charging unit 18 for removing any residual charge from the imaging belt 14 by uniform irradiation of light to the imaging belt 14.

Figure 3:
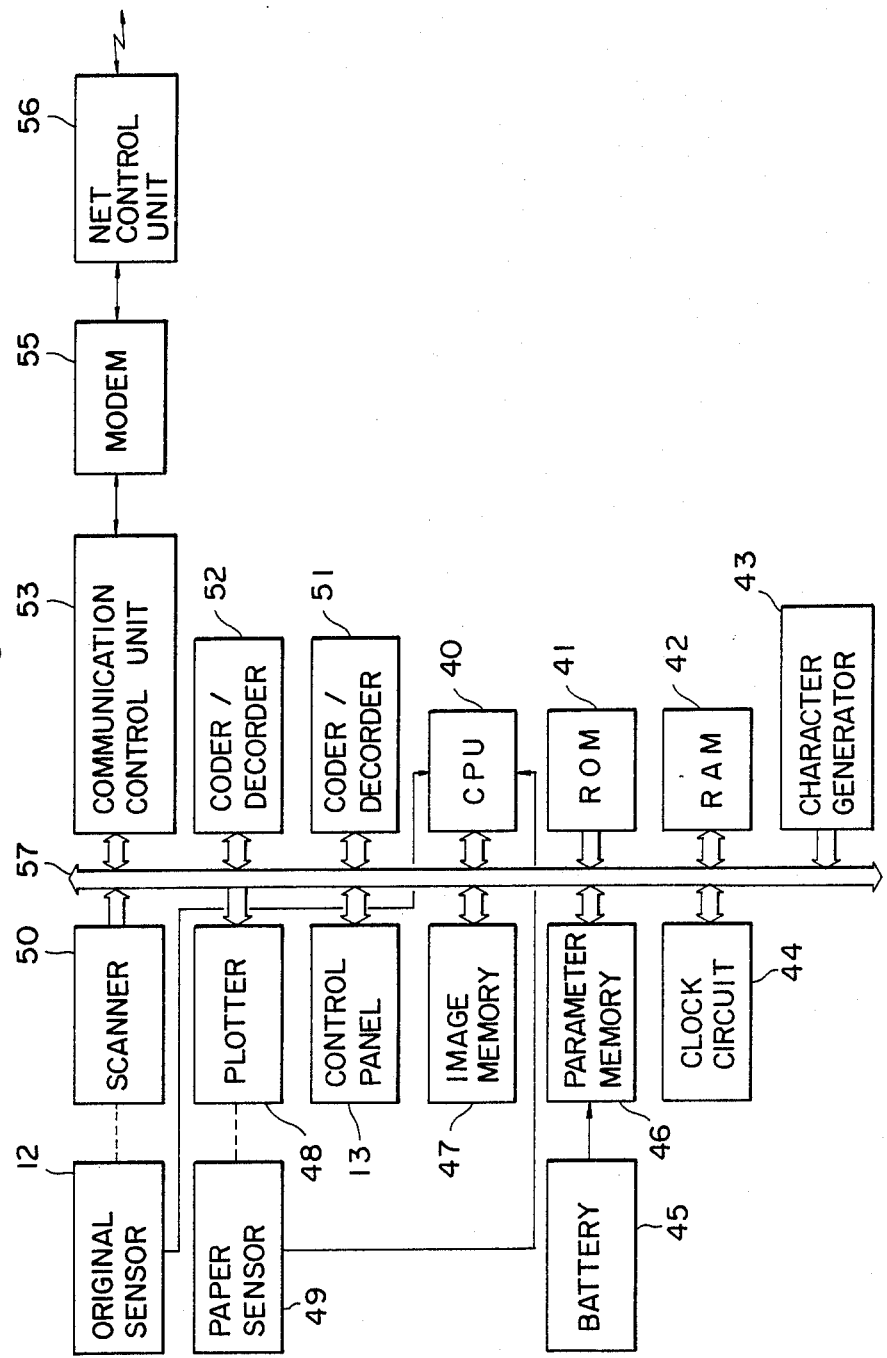
FIG. 3 is a block diagram showing a control system of the facsimile machine shown in FIGS. 1 and 2.
Figure 4:
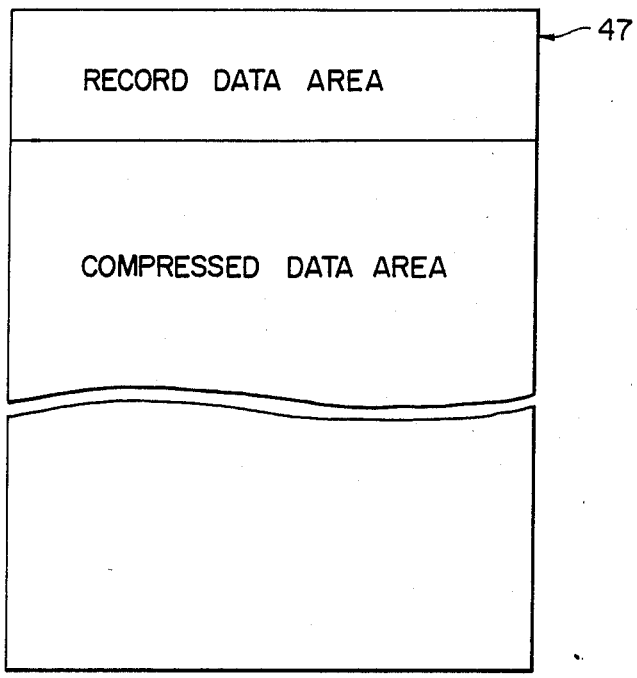
FIG. 4 is a schematic illustration which is useful for explaining the operation of the image memory 47 provided in the control system shown in FIG. 3.

Referring now to FIG. 3, there is shown in block form a control system for controlling the overall operation of the present facsimile machine. As shown, the control system includes a central processing unit or simply CPU 40, a read only memory or simply ROM 41 for storing a predetermined program and a random access memory or simply RAM 42 for storing temporary data and providing a work area. A character generator 43 is also provided in the control system for generating various character and symbol patterns to be displayed at a display section of the control panel 13. The control system further includes a clock circuit 44 for outputting a clock data signal and a parameter memory 46, to which a battery 45 is connected, for storing various data, for example, input from keys provided at the control panel 13. Also provided in the control system is an image memory 47 which temporarily stores non-compressed image data to be supplied to a plotter 48 for printing on a cut sheet of recording medium and compressed image data during transmitting or receiving mode of operation. As shown in FIG. 4, the image memory 47 is so structured that it includes a predetermined record data area for storing non-compressed data to be recorded corresponding to the maximum size (for example, B4 size) of an image which can be recorded by the plotter 48 and a predetermined compressed data area for storing compressed image data which is to be transmitted to or has been received from another facsimile machine. In one example, the compressed data area has a capacity to store compressed image data of 60 sheets of original documents.

As shown in FIG. 3, the control system further includes a paper sensor 49 which is partly provided in the cassette 21 and partly provided on the tray 25 for supplying detection signals to the CPU 40. Besides, the original document sensor 12 provided in the original holder 1 for detecting the size of an original document to be read also sends a detection signal to the CPU 40. A pair of coder/decoder units 51 and 52 is also provided in the present control system and each of them provides a converting function between a non-compressed (not encoded or decoded) image data and a compressed (encoded) image data. It is to be noted that each of the coder/decoder units 51 and 52 has a plurality of coding and decoding modes of operation. When an original document is optically read by the scanner 50, there is obtained an image data which is not compressed. The image data thus obtained is encoded according to a predetermined encoding method so that the image data becomes compressed. And, the image data is transmitted to another facsimile machine in a compressed format. Thus, an image signal received from another facsimile machine is typically compressed or encoded, and, thus, the received image data is decoded or uncompressed to recover the original image data before being supplied to the plotter 48.

Also provided in the present control system is a communication control unit 53 which takes care of communication of image information with another facsimile machine according to a predetermined facsimile transmission control procedure. The communication control unit 53 is connected to a net control unit 56 through a MODEM 55 which modulates an demodulates digital data so as to allow to use an analog transmission network, such as the public telephone network, as a transmission line. The net control unit 56 is provided to allow the present facsimile machine to be connected to the public telephone network. It is to be noted that the net control unit 56 is equipped with an automatic calling and answering function. A bus line 57 is provided to interconnect the above-described elements as shown in FIG. 3.

In operation, during transmission (storing) mode, an image signal produced from the scanner 50 by optically reading an original document is transferred to the coder/decoder unit 51 or 52 under the control of CPU 40, where the image signal is encoded or compressed. Then, the thus compressed image data is stored into the compressed data area of the image memory 47 as shown in FIG. 4. Then, upon connection with a destination facsimile machine in accordance with a predetermined procedure, the compressed image data stored in the image memory 47 is transmitted to the destination facsimile machine. In this case, if the encoding method set by the pre-transmission procedure differs from the encoding method employed at the time of storing data into the image memory 47, the compressed image data stored in the image memory 47 is again decoded to the original non-compressed image data by the coder/decoder unit 51 and the thus decoded image data is once again encoded by the coder/decoder 52 in accordance with the encoding method set by the pre-transmission procedure and then the thus re-encoded image data is transmitted to the destination facsimile machine.

In transmitting compressed image data, transmission identification information is added at the leading edge of a group of data corresponding to a single sheet of original document. In addition, if it is set by an operator, a predetermined statement is added.

On the other hand, during receiving mode of operation, all of the received (compressed) image data is once stored into the compressed data area of the image memory 47. Then, the compressed image data is transferred to the coder/decoder 51 or 52, where the compressed data is decoded to the original uncompressed data in sequence and the thus uncompressed data is then stored into the record data area of the image memory 47. As soon as uncompressed image data of the amount corresponding to a single cut sheet of recording medium currently selected for use has been stored into the image memory 47, the uncompressed image data is transferred to the plotter 48 for use in recording on a cut sheet of recording medium. This process is repeated until the receiving mode of operation is completed.

In the case where a confidential transmission mode has been set, all of the compressed image data as received is stored into the image memory 47. Moreover, if the recording medium run out in the midst of receiving mode of operation, the image data received thereafter is stored into the image memory 47 as being compressed (proxy transmission). The image data thus stored in the image memory 47 is set in a condition to be transferred to the plotter 48 for recording only when a correct pass word has been input in the case of the confidential transmission mode or cut sheets of recording medium have been replenished in the case of the proxy transmission mode. Under this condition, when a start key (not shown) provided in the control panel 13 is depressed, the recording operation by the plotter 48 is initiated, so that the image stored in the image memory 47 is first restored to the original umcompressed image data by the coder/decoder 51 or 52 while storing the thus restored original image data into the record data area of the image memory 47. And, each time when the amount of image data stored into the record data area of the image memory 47 reaches a predetermined amount, typically corresponding to the amount of a single page, the image data is transferred from the image memory 47 to the plotter 48.

Figure 5:
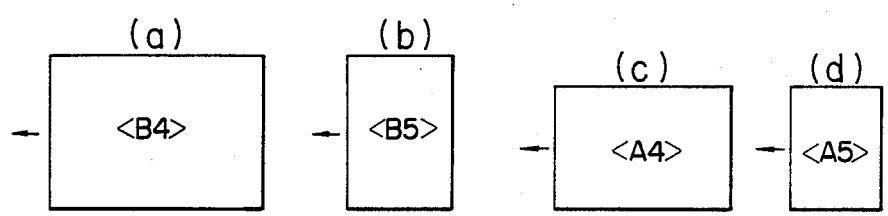
FIG. 5 is a schematic illustration exemplifying the direction of transportation of a cut sheet of recording medium.

FIG. 5 shows several examples of how cut sheets of recording medium different in size are oriented when set in position. It is to be noted that, in the illustrated case, the maximum size of cut sheets of recording medium which may be set in the plotter 48 is B4. The direction of transportation is indicated by the arrow. As shown, the B4-sized and A4-sized sheets are transported with their longitudinal directions in parallel with the transporting direction. This mode of transportation may be called "longitudinal" transportation. On the other hand, the B5-sized and A5-sized sheets are transported with their longitudinal directions oriented perpendicular to the transporting direction, and this mode of transportation may be called "transverse" transportation. Since the cut sheets of recording medium are set with particular orientations as indicated in FIG. 5, original documents of corresponding sizes must be set on the original holder 1 in a corresponding manner. That is, an original document must be transported in a manner having the corresponding size shown in FIG. 5.

Since the B4-sized sheet is transported in the longitudinal mode and the B5-sized sheet is transported in the transverse mode, there is no difference in the recording width when recording is to be carried out by the plotter 48 using either the B4-sized sheet or the B5-size sheet. Thus, the recording mode using either the B4-sized or B5-sized sheet has a B size recording width. Similarly, the recording mode using either the A4-sized or A5-sized sheet has an A size recording width. On the other hand, the management of data storage in the record data area of the image memory 47 is carried out by the number of lines irrespective of the width of an image.

Typically, in the pre-transmission procedure of a facsimile communication, a transmitter normally sends width information of an original document, such as A size or B size.

Figure 6:
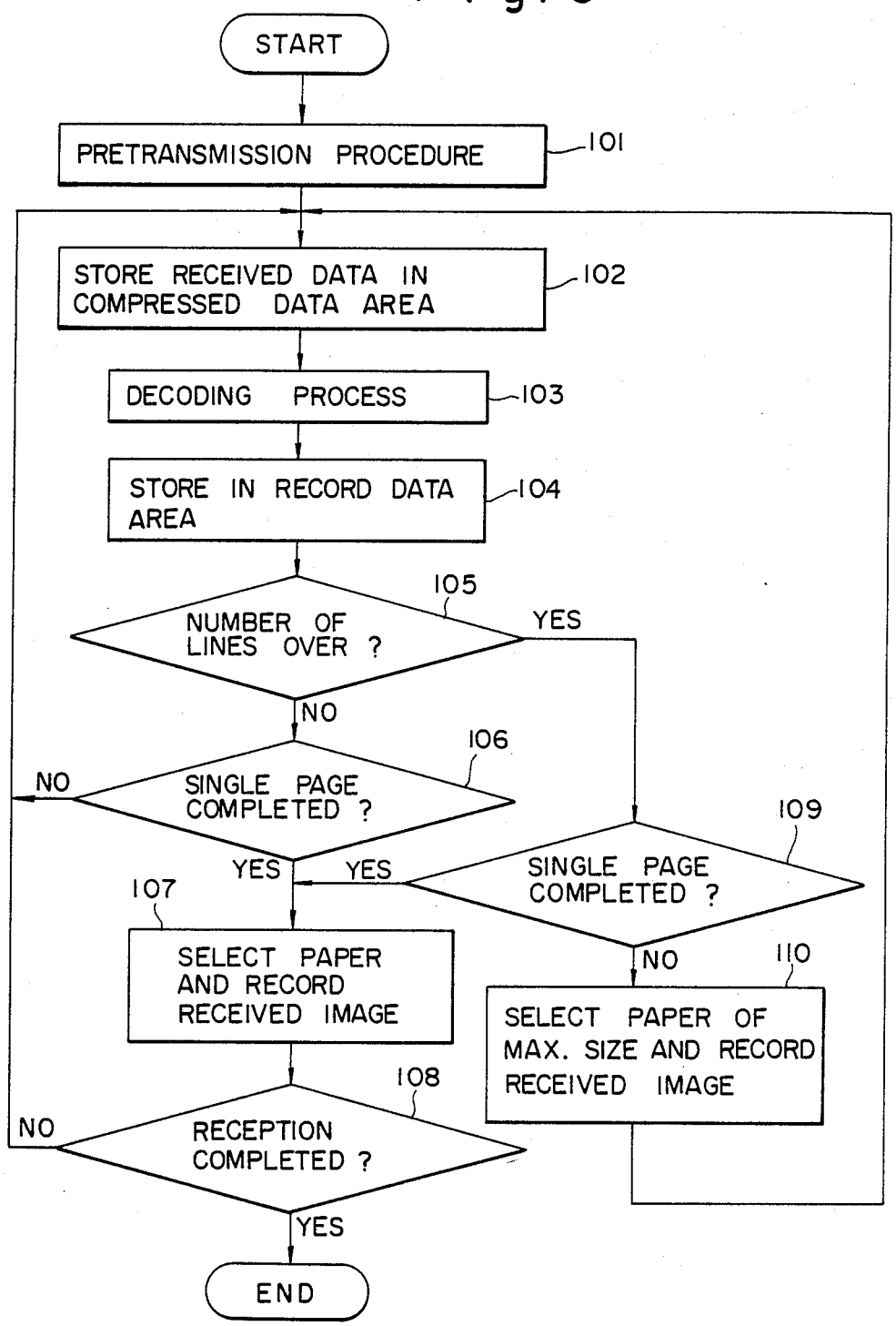
FIG. 6 is a flow chart which is useful for explaining one example of the sequence of steps which are implemented during the receiving mode of the present facsimile machine.

Now, a process for receiving and recording image data of a relatively long original document in accordance with one embodiment of the present invention will be described with particular reference to FIG. 6. If the plotter 48 of the present facsimile machine is provided with cut sheets of recording paper whose widths match the width information of original document received during the pre-transmission procedure 101, then the receiving mode of operation is initiated. In the first place, under the control of CPU 40, the received image data is once stored in the compressed data area of the image memory 47 at step 102, and the thus stored image data is supplied to the coder/decoder 51 or 52 line by line to have it restored to the original image data at step 103. The thus restored original image data is then sequentially stored into the record data area of the image memory 47 at step 104. In this case, each time when a single line of original image data has been stored, it is checked whether or not the number of lines of the original image data stored exceeds the maximum number of lines of the largest one among those cut sheets which are set in position and which have enough width for recording the received image at step 105. If the result at step 105 is negative, then it is determined whether or not image data has been stored into the record data area of the image memory 47 of the amount corresponding to that of a single page at step 106. If the result is negative, then it proceeds back to the step 102. On the other hand, if the result of determination at step 106 is affirmative, then an appropriate cut sheet of recording medium is selected for use depending on the width information of received image and the number of lines of the image data stored in the record data area of the image memory 47, and then the image data stored in the record data area of the image memory 47 is transferred to the plotter 48 in sequence, thereby recording the received image on the selected cut sheet of recording medium at step 107. This process is repeated until the completion of the receiving mode of operation is detected at step 108. On the other hand, if the result of determination at step 105 is affirmative and yet the processing of a single page has not yet been completed, i.e., the result of determination at step 109 being negative, since this indicates the fact that the number of lines of the image data thus processed is more than the number of lines for the largest sized cut sheet among those cut sheets having enough width for recording the received image, the largest cut sheet of recording medium among those currently set in the plotter 48 is selected at this time, and, then, the image data now stored in the record data area of the image memory 47 is sequentially transferred to the plotter 48 to effect printing on the selected cut sheet of recording medium at step 110. At the same time, it proceeds back to step 102 to continue the processing of the succeeding received image data.

In this case, however, until the recording of the image data of this relatively long page or sheet of original document has been completed, the step 107 is so set that the plotter 48 remains to select the largest cut sheet of recording paper. In other words, for example, supposing that the plotter 48 is provided with B5 sized cut sheets of recording medium and A4 sized cut sheets of recording medium, if the received image data has a B size width, then the B5 sized cut sheets of recording medium are selected for use; whereas, if the received image data has an A size width, then the A4 sized cut sheets of recording medium are selected for use. It is also so structured that, in the case where both of B4-sized and A4-sized cut sheets of recording medium are set in the plotter 48, the larger B4-sized cut sheets of recording medium are selected irrespective of the width of the received image data. Of importance, once a particular size of cut sheets of recording paper has been selected, its selection remains unchanged until recording of all of the image of the single original document has been completed. As a result, it is insured that the image of a relatively long original document is recorded on a plurality of cut sheets of recording material of the same size as divided at all times.

As the image data stored in the record data area of the image memory 47 is sequentially transferred to the plotter 48 at step 110, there is produced an increasing empty region in the record data area; however, it may be so structured that the succeeding image data is supplied to the empty region thus created. In this case, it is necessary to monitor the boundary between the preceding and succeeding data in the record data area. On the other hand, if the result of determination at step 109 is affirmative, then it proceeds to step 107, whereby the image data is recorded as a single page.

In this manner, in accordance with the present invention, if the image data of a long original document has been received, it is recorded on a plurality of cut sheets of recording medium as divided in sequence. And, thus, the image may be properly received and recorded however long the original document may be. In this case, in accordance with the present invention, it is so structured that the size of cut sheets of recording medium remains unchanged until recording of all of the image data of the same long original document has been completed. Thus, even if the image data of the same original document is recorded on two or more cut sheets of recording paper, it is convenient when the recorded cut sheets are combined one after another because the recorded cut sheets are all of the same size.

Suppose that cut sheets of recording medium having the B5 size are stored in the cassette 21 and cut sheets of recording medium having the B4 size are stored as stacked on the tray 25. In this case, both of the cut sheets have the same width with respect to the transporting direction as indicated in (a) and (b) in FIG. 5. Thus, when the image data of a long original document has been received, if the last remaining image data is of the amount less than that of a B5 sized cut sheet of recording medium, then it may be recorded on a cut sheet of recording medium of B5 size, if desired, even if the preceding cut sheets of recording medium were all B4 size. Similarly, if the two or more cut sheets of recording medium set in the facsimile machine all have the same A size width, such as A4 and A5, then the remaining image data may be recorded on a cut sheet of A5 size even if the preceding image data has been recorded on one or more cut sheets of A4 size. Therefore, as long as the width remains unchanged, use may be made of differently sized cut sheets of recording medium when recording image data of a relatively long original document as divided.

Furthermore, it is preferably so structured than a division mark, such "*" mark, is added at the bottom of the cut sheet of recording medium if there is any succeeding cut sheet of recording medium for recording the remaining image data as divided. In addition, the page number may be inserted at a predetermined location for the second and following pages when recording the image data of a long original document as divided, thereby allowing one to understands how the two or more cut sheets of recording medium should be combined side-by-side to redefine the original image as a unit.

Figure 7:
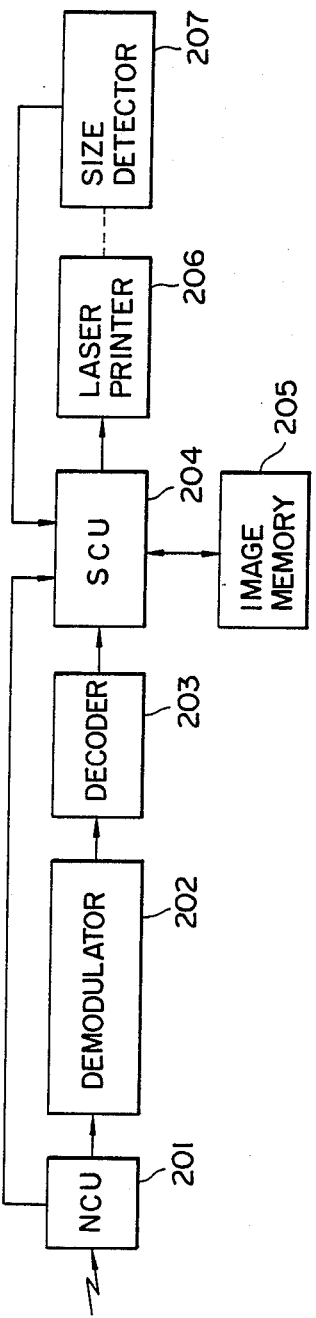
FIG. 7 is a block diagram showing the overall structure of a fascimile machine constructed in accordance with another embodiment of the present invention.

Referring now to FIG. 7, there is schematically shown in block form a facsimile machine constructed in accordance with another embodiment of the present invention. As shown, the facsimile machine of this embodiment includes a net control unit 201 which has a function of connecting the present facsimile machine to a transmission line, such as the public telephone network as in the present embodiment. The image data received through the transmission line is modulated and encoded, and thus it is demodulated by a demodulator 202 and then decoded by a decoder 203, thereby recovering an original image data without compression. The recovered image data is then supplied to a system control unit 204 which causes the received image data to be temporarily stored in an image memory 205. A laser printer 206 is connected to the system control unit 204. Upon receipt of a command from the system control unit 204, the laser printer 206 reads out the image data stored in the image memory 205 and has it recorded on a cut sheet of recording medium. The laser printer 206 is provided with a size detector 207 for detecting the size of cut sheets of recording medium set in the laser printer 206. The size detection signal generated by the size detector 207 is supplied to the system control unit 204. In the present embodiment, the system control unit 204 is equipped with a function of controlling the processing of received image data and the recording of the received image data using the laser printer 206 in an asynchronous manner.

Figure 8:
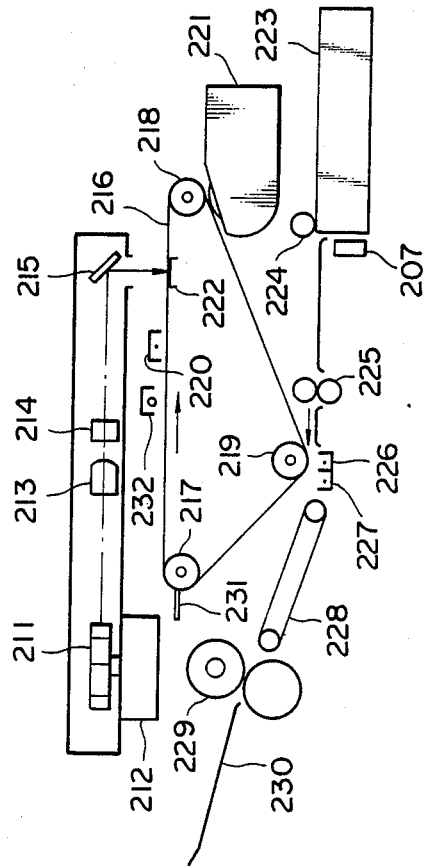
FIG. 8 is a schematic illustration showing the overall structure of a laser printer which may be advantageously applied to the facsimile machine shown in FIG. 7.

FIG. 8 schematically shows in detail the structure of the laser printer 206 provided in the facsimile machine shown in FIG. 7. As shown in FIG. 8, a laser light beam emitted from a beam source (not shown), such as a laser diode, as modulated by an image signal is deflected by a polygon mirror 211 which is driven to rotate in a predetermined direction at constant speed. The thus deflected laser light beam is passed through a fθ lens 213, whereby the sweeping speed in the scanning direction is made uniform. Then, the laser light beam passes through a cylindrical lens 214 and is reflected by a mirror 215 onto an imaging belt 216, for example, of photosensitive material in the form of an endless belt. The imaging belt 216 is extended around three rollers 217, 218 and 219, at least one of which is driven to rotate, thereby causing the imaging belt 216 to travel in the direction indicated by the arrow.

As the imaging belt 216 travels, its outer surface is uniformly charged by a corona charging unit 220 and the thus charged surface is scanned by the laser light beam, whereby the uniform charge is selectively dissipated in accordance with a light image pattern so that an electrostatic latent image is formed on the imaging belt 216. The latent image is then developed by a developing unit 221 to be converted into a toner image. It is to be noted that a back plate 222 is disposed to be in contact with the inner surface of the imaging belt 216 at an exposure station so that the imaging belt 216 is maintained substantially flat locally at the exposure station.

A cassette 223 storing therein a quantity of cut sheets of recording medium in the form of a stack is detachably mounted below the developing unit 221. A pick-up roller 224 is disposed at a supply end of the cassette 223, and, thus, when the pick-up roller 224 is intermittently driven to rotate, the topmost sheet is fed and transported until its leading edge comes into contact with a registration roller 225. Thus the cut sheet of recording medium thus supplied is held stationary for a while. In association with the travelling motion of the imaging belt 216, the registration roller 225 is driven to rotate so that the cut sheet is again caused to advance. As a result, the cut sheet is brought into contact with the imaging belt 216 such that the leading edge of the cut sheet is in registry with the leading edge of the developed toner image on the imaging belt 216. Then, the cut sheet in contact with the imaging belt 216 moves past a corona image transfer unit 226 so that the toner image on the imaging belt 216 is transferred to the cut sheet. In the illustrated embodiment, since a separating corona unit 227 is provided adjacent to the image transfer unit 226, the cut sheet to which the toner image has been transferred is separated away from the imaging belt 216 and then guided toward an image fixing unit 229 as riding on a transportation belt 228. While the cut sheet is passing through the image fixing unit 229, the transferred toner image becomes permanently fixed to the cut sheet, which, in turn, is discharged out onto a stacker 230.

A cleaning blade 231 is provided in scrubbing contact with the imaging belt 216 so that any residual toner on the imaging belt 216 is scraped off the imaging belt 216. On the other hand, a charge removing lamp 232 is also provided and it applies a uniform illumination to the imaging belt 216 to have any residual charge removed.

At the front end of the cassette 223 is provided a size indicator which is typically comprised of a magnetic or optical pattern and which indicates the size of the cut sheets of recording paper stored in the cassette 223. A size detector 207 is provided adjacent to the front end of the cassette 223 for detecting the size indicator. Preferably, the size detector 207 includes a sensor for reading the size indicator and an encoder for encoding a detection signal produced from the sensor, whereby an output signal from the encoder is supplied to the system control unit 204 as a size signal.

It is to be noted that the orientation of cut sheets of recording medium stored in the cassette 223 with respect to the transporting direction is set as illustrated in FIG. 5. In the illustrated embodiment, it is assumed that the maximum size of cut sheets usable with the laser printer 206 is B4.

Figure 9B:
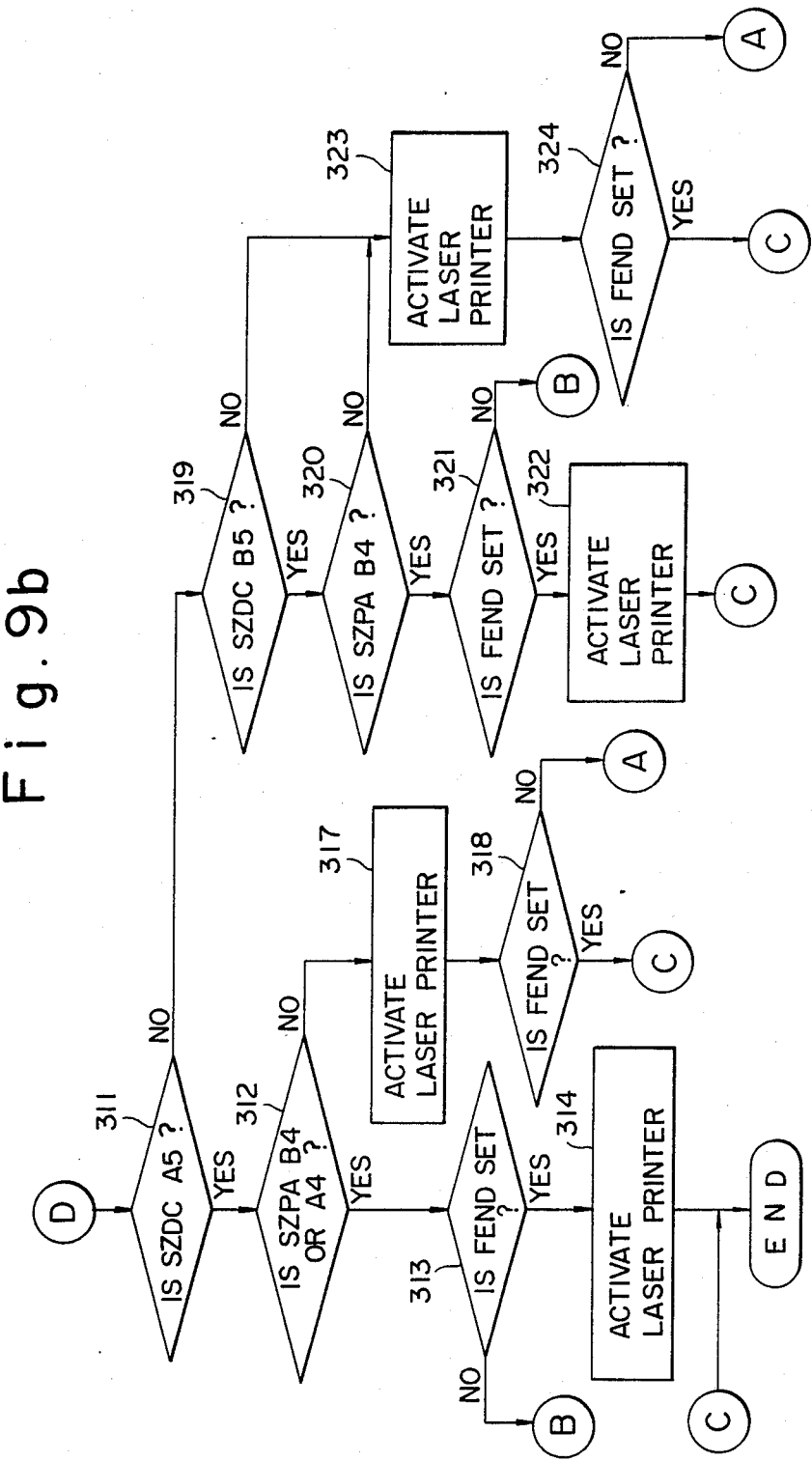

Now, the receiving mode of operation of the facsimile machine having the above-described structure will be described with reference to FIGS. 9a and 9b. At first, when a call is received, the system control unit 204 carries out a predetermined pre-transmission control procedure 301, whereby predetermined information is exchanged with a calling or transmitting facsimile machine. Upon completion of the pre-transmission control procedure, a counter CNT for keeping track of the page number of image data stored is set to zero at step 302. Then, image data for a single page is received and decoded to the original image data which, in turn, is stored into the image memory 205 at step 303. At this juncture, if the transmission has completed (i.e., the result of determination at step 304 being affirmative), then a post-transmission control procedure is implemented at step 305 and then a flag FEND, which indicates the end of transmission, is set at step 306, followed by the step of incrementing the counter CNT at step 307. On the other hand, if the transmission has not yet completed (i.e., the result of determination at step 304 being negative), then it proceeds to step 307 by skipping steps 305 and 306.

Then, it is determined whether or not the count of the counter CNT is larger than unity at step 308. If the result of this determination at step 308 is negative, then the size of the received image data is determined from the amount of image data so far stored and its result is stored as data SZDC at step 309. In succession, the size of cut sheets of recording medium is detected from an output from the size detector 207 and its result is stored as data SZPA at step 310. And, if data SZDC indicates A5 size (i.e., the result of determination at step 311 being affirmative), then it is checked whether or not data SZPA indicates either B4 size or A4 size at step 312. If the result of determination at step 312 is affirmative, then the condition of flag FEND is examined. And, if flag FEND has been found to be not set (i.e., the result of determination at step 313 being negative), then it goes back to step 303, thereby starting to receive the image data of the next following page and have it stored in the image memory 205.

On the other hand, if the result of determination at step 313 is affirmative, then it indicates the last page of a total number of original documents, which is an odd number. Thus, the laser printer 206 is activated to carry out recording of this last page at step 314. If the result of determination at step 308 is affirmative, then the laser printer 206 is activated, whereby 2 pages of image data stored in the image memory 205 are recorded at step 315. And, then, the condition of flag FEND is checked at step 316, and if flag FEND has been found to be set (i.e., the result of determination at step 316 being affirmative), then it goes out of this reception processing routine because it indicates the completion of transmission. On the other hand, if flag FEND is not set (i.e., the result of determination at step 316 being negative), then it goes back to step 302 so that the counter CNT is first cleared to zero and the image data of the next following page is received and stored.

If the result of determination at step 312 is negative, since it indicates the fact that the size of cut sheets stored in the cassette 223 is either A5 size or B5 size, then the laser printer 206 is activated and a single page of image data is recorded at step 317. Thereafter, the condition of flag FEND is examined at step 318. If flag FEND is set (i.e., the result of determination at step 318 being affirmative), then it goes out of this reception processing routine because it indicates the completion of transmission. On the other hand, if flag FEND is not set (i.e., the result of determination at step 318 being negative), then it goes back to step 302.

If the result of determination at step 311 is negative, then it is checked whether or not data SZDC indicates B5 size at step 319. If the result of determination at step 319 turns out to be affirmative, then it is checked whether or not data SZPA indicates B4 size at step 320. In the case where the result of determination at step 320 is affirmative, then the condition of flag FEND is examined. If flag FEND is not set (i.e., the result of determination at step 321 being negative), then it goes back to step 303, whereby the image data of the next following page is received and stored in the image memory 205. If the result of determination at step 321 is affirmative, then it indicates the last page of a total number of original documents, which is an odd number, so that the laser printer 206 is activated and the image data of that last page is recorded at step 322.

In the case when the result of determination at step 319 is negative, and in the case when the result of determination at step 320 is negative, then step 323 is executed thereby causing the laser printer 206 to record the received image data. And, upon completion of step 323, the condition of flag FEND is examined at step 324. If flag FEND is set (i.e., the result of determination at step 324 being affirmative), then it goes out of this reception processing routine. On the other hand, if flag FEND is not set (i.e., the result of determination at step 324 being negative), then it goes back to step 302.

Accordingly, in the case where the received image data has A5 size and the cut sheets have either B4 of A5 size, if the image data of an odd number page is received, then the result of determination at step 308 becomes negative, the result of determination at step 311 becomes affirmative, the result of determination at step 312 becomes affirmative, and the result of determination at step 313 become negative, which brings back to step 303. As a result, under this condition, the reception of image data of the next following page is carried out with only a single page of received image data being stored in the image memory 205 and the count of counter CNT storing the number of received pages being preserved. And, then, when the image of an even number page is received, the result of determination at step 308 becomes affirmative, so that step 315 is executed, whereby 2 pages of image data are recorded on a single cut sheet of recording medium. At this time, if the transmission has not yet been completed, the count of counter CNT is cleared to zero at step 302 and then the image data of the next following page is received.

Now, in the case where the received image data has a B5 size and the cut sheets of recording medium stored in the cassette 223 has a B4 size, when the image data of an odd number page is received, the result of determination at step 308 becomes negative, the result of determination at step 311 becomes negative, the result of determination at step 319 becomes negative, and the result of determination at step 320 becomes affirmative, which brings the process back to step 303. As a result, also in this case, the image data of the next following page is received with a single page of received image data being stored in the image memory 205 and the count of counter CNT being preserved. And, when the image data of an even number page is received, the result of determination at step 308 becomes affirmative, so that, similarly as above, 2 pages of received image data are recorded on a single cut sheet of recording medium. And, if the transmission has not yet been completed, then, after clearing the count of counter CNT to zero, the image data of the next following page is received.

In the case where the received image data has neither a B5 size nor a A5 size, each time when the image data of each page has been received, the result of determination at step 308 becomes negative, the result of determination at step 311 becomes negative, and the result of determination at step 319 becomes negative, so that a single page of received image data is recorded on a single cut sheet of recording medium by the laser printer 206. And, when the transmission is completed, the count of counter CNT is cleared to zero, and then the image data of the next following page is received. And, in this reception processing, the condition of flag FEND is checked at steps 313, 316, 318, 321 and 324. If set, the reception processing is terminated.

In the above-described reception processing, no description has been given as to the case of a combination of a size of received image data, which cannot be recorded as it is, and a size of a cut sheet of recording medium. However, in such a case, a process similar to the conventional one may be carried out. For example, if the received image data has an A4 size and a cut sheet of recording medium has a B5 size, then the received image data may be recorded on the cut sheet as reduced in size appropriately.

If the image data received from a transmitting facsimile machine is such that an original document of either B5 or A5 size has been read with its longitudinal direction in parallel with the transporting direction, then the received image data may be appropriately adjusted in orientation in conformity with the orientation of cut sheets of recording medium of these sizes at the system control unit 204 before being supplied to the laser printer 206.

It should be noted that the above-described embodiments used the laser printer as the page printer. However, any other type of printer, such as an electrostatic printer or liquid-crystal shutter printer, may also be used in place of the laser printer.

While the above provides a full and complete disclosure of the preferred embodiments of the present invention, various modifications, alternate constructions and equivalents may be employed without departing from the true spirit and scope of the invention. Therefore, the above description and illustration should not be construed as limiting the scope of the invention, which is defined by the appended claims.

What is claimed is:

1. A facsimile machine comprising:
   communicating means for communicating with another facsimile machine through a transmission line;
   recording means for recording data received from said another facsmile machine on a cut sheet of recording medium on a page-by-page basis, said recording means including storing means capable of storing at least two differently sized cut sheets of recording medium; and
   control means for controlling the overall operation of said facsimile machine during reception of recording data from said another facsimile machine, said control means selecting one of said at least two differently sized cut sheets of recording medium on the basis of the amount of data per original document transmitted as long as an amount of data per original document of said data transmitted is equal to or smaller than that of a maximum-sized cut sheet of recording medium in a normal mode, said control means dividing the received data corresponding to a single, long original document into segments in accordance with the maximum-sized cut sheet when said data to be recorded of said single, long original documenty has a number of print lines exceeding that of said maximum-sized cut sheet of recording medium and selecting said maximum-sized cut sheet and keeping the selection of said maximum-sized cut sheet of recording medium at least until all of said data of the said single, long original document has been recorded by said recoding means, said control means then selecting cut sheet size for a next original document based on the size of said next original document.

2. The machine of claim 1 wherein all of said at least two differently sized cut sheets of recording medium have the same width.

3. The machine of claim 1 wherein said recording means includes a page printer for recording said data of a single page on a single cut sheet of recording medium.

4. The machine of claim 3 wherein said page printer is a laser printer.

5. The machine of claim 1 further comprising: means for compressing and decompressing said data; first storing means for storing said data as being compressed; second storing means for storing said data after having been decompressed by said compressing and decompressing means, and second storing means having a capacity to store said decompressed data of an amount for recording on a cut sheet of recording medium having a maximum size.

6. The machine of claim 1 further comprising reading means for optically reading an original document to produce said data.

* * * * *